United States Patent [19]

Delaunay et al.

[11] 4,372,428

[45] Feb. 8, 1983

[54] DISC BRAKE HAVING SLIDING CALIPER

[75] Inventors: Jean Delaunay, Drancy; Claude Le Marchand, Domont, both of France

[73] Assignee: Societe Anonyme D.B.A., Paris, France

[21] Appl. No.: 200,679

[22] Filed: Oct. 27, 1980

[30] Foreign Application Priority Data

Nov. 8, 1979 [FR] France ................. 79 27568

[51] Int. Cl.³ .............................. F16D 65/18
[52] U.S. Cl. ................. 188/73.35; 188/73.34; 188/73.45
[58] Field of Search ............ 188/73.34, 73.35, 73.45, 188/73.39, 72.4

[56] References Cited

U.S. PATENT DOCUMENTS 3,616,876 11/1971 Brooks ............................. 188/73.45
3,805,925 4/1974 Schoenhenz ..................... 188/73.45

FOREIGN PATENT DOCUMENTS 2647911 10/1977 Fed. Rep. of Germany ... 188/73.45
1500830 11/1967 France .
2073920 10/1971 France .
2142248 1/1973 France .
2221028 10/1974 France .
55-54732 4/1980 Japan ............................. 188/73.45

Primary Examiner—Douglas C. Butler
Assistant Examiner—R. R. Diefendorf
Attorney, Agent, or Firm—Paul David Schoenle; Ken C. Decker

[57] ABSTRACT

The brake comprises a caliper (14) mounted for sliding on a fixed support by two axial columns (16 and 18) cooperating with bores (38, 40) formed in the caliper. The bores (38, 40) are provided with notches (42, 44) permitting the introduction of the columns (16, 18) transversely and without dismounting the latter. One of the columns (16) is equipped with a resilient sleeve (51) on which there is formed a projection (52) cooperating resiliently with the corresponding bore (38) of the caliper (14) to ensure functions of automatic recentring of the caliper and of anti-noise spring.

1 Claim, 5 Drawing Figures

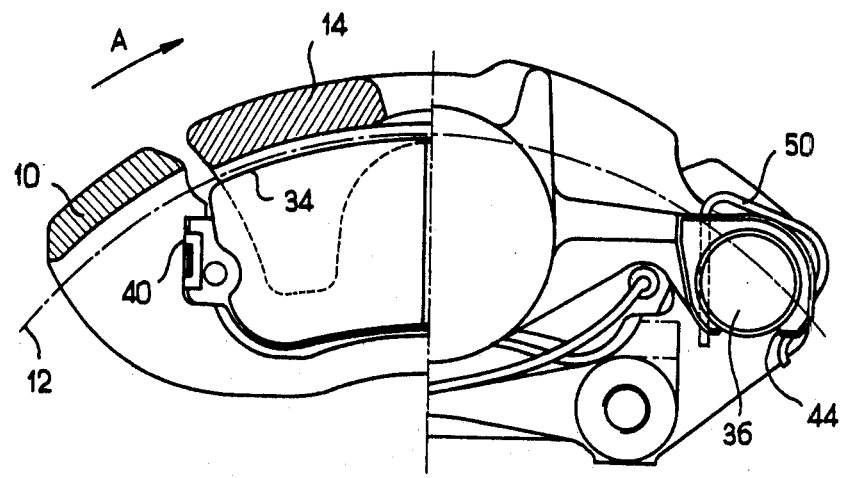
FIG_1
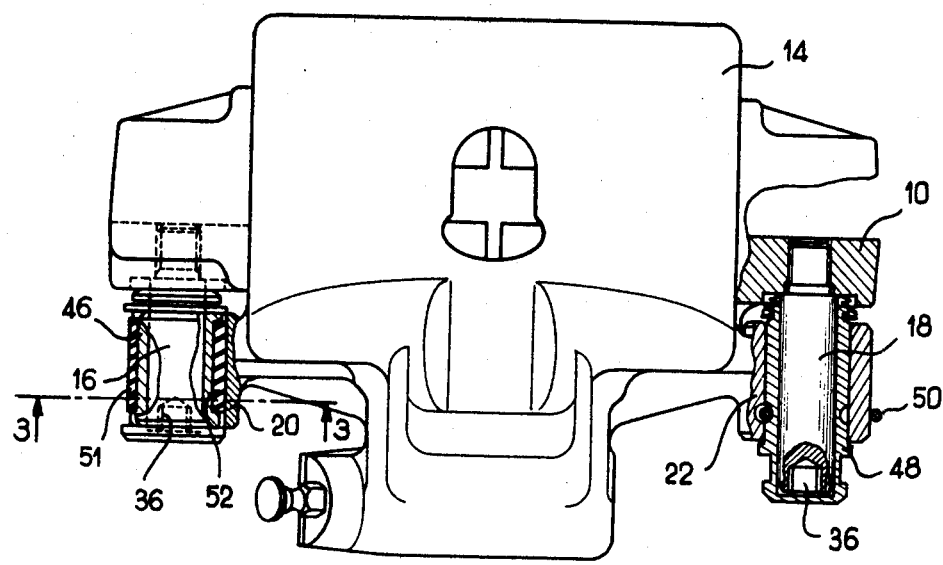
FIG_2

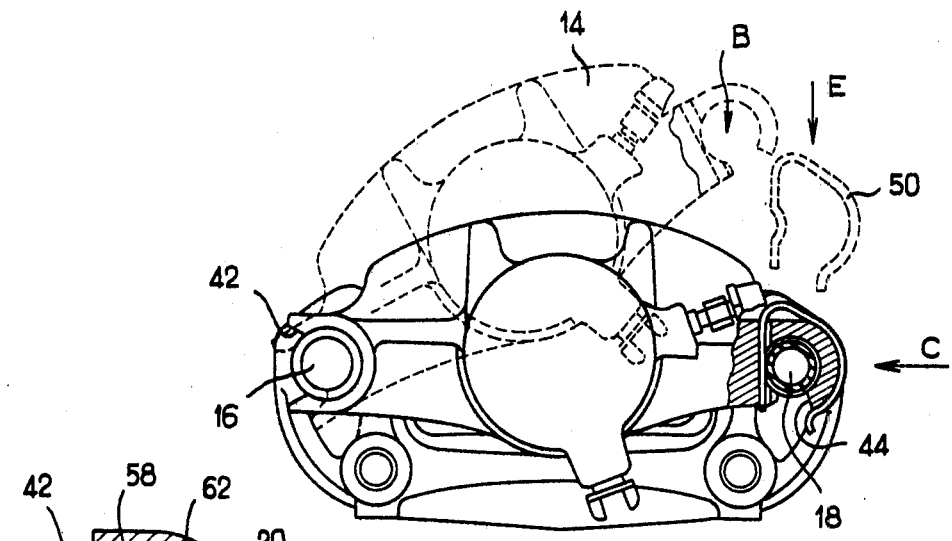
FIG_4
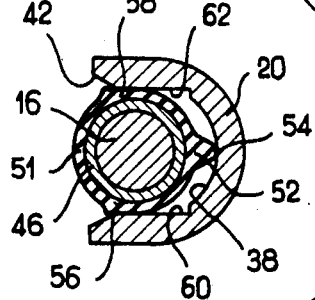
FIG_3
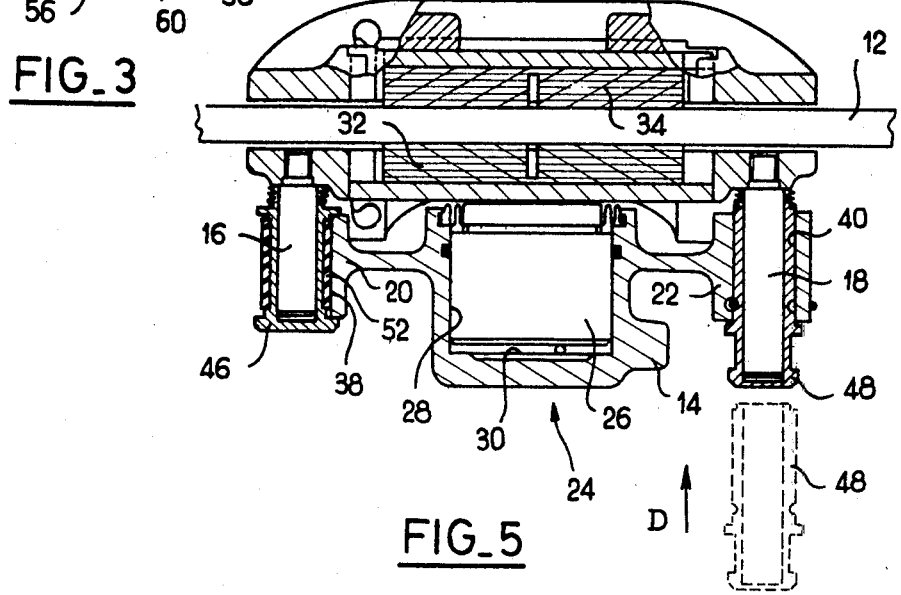
FIG_5

DISC BRAKE HAVING SLIDING CALIPER

The invention relates to a disc brake of the sliding caliper type, particularly for a motor vehicle.

The invention relates, in particular, to a disc brake of the type having a slidable caliper which is mounted for sliding, by means of two axial columns, on a fixed support in which two friction elements are received, anchored and for sliding, which are capable of coming into frictional engagement with the opposite faces of a rotating disc on operation of actuating means consisting of a brake motor acting directly on one of the friction elements and acting on the other friction element by reaction through the slidable caliper.

A disc brake of the type defined above is known from French Pat. No. 2 142 248 in which the columns pass through bores provided and facing one another in the fixed support and in the caliper. The bores provided in the caliper have substantially the shape of a C, in cross section, so that the columns can be introduced into the bores in the caliper by being presented transversely in relation to their axis; locking and sliding sleeves are further mounted on each of the columns to cooperate with the C-shaped bores provided in the caliper.

In this type of brake, there is necessarily functional plays between the caliper, the columns and their respective sleeves, so that, as a result of the vibrations inherent in the installation of such brakes on a motor vehicle, these functional plays give rise to vibrations causing parasiting noises which it is usual to attenuate or prevent by means of one or more anti-noise springs. The different functional plays may likewise cause, on actuation of the brake, a pivotal phenomenon of the caliper in a plane perpendicular to the plane of the disc which is harmful to the satisfactory operation of the brake and which it is usual to attenuate or to eliminate by means of springs.

The use of such springs increases the number of components in the brake and necessitates additional machining operations on the caliper and the sleeves.

During the assembly of the brake, the installation of such springs is made difficult by the initial stress stored in these springs and which has to be overcome during the mounting. This initial stress is generally high when it is desired to obtain a satisfactory effectiveness of the spring or springs in their anti-noise and anti-pivoting functions. Moreover, the risk of accidental escape of such a spring does not always correspond to the demands of reliability required in the braking systems of motor vehicles.

The invention relates to a disc brake of the type described above in which the use of an anti-noise spring is eliminated.

For this purpose, the invention proposes a disc brake with a caliper mounted for sliding, by means of two axial columns, on a fixed support in which two friction elements are received, anchored and for sliding, which are capable of coming into frictional engagement with the opposite faces of a rotating disc on operation of actuating means consisting of a brake motor acting directly on one of the friction elements and acting on the other friction element by reaction through the sliding caliper, said columns passing through bores provided facing one another in the fixed support and in the yoke, the bores provided in the caliper being provided with notches and having substantially the shape of a C in cross section so that said columns can be introduced into the open bores by being presented transversely with respect to their axis and without dismounting said columns, said disc defining, when it rotates in the direction corresponding to forward travel of the vehicle, one front column and one rear column, the notch of the bore in which the rear column is engaged being directed in the direction of the plane containing the two axes of the two columns and extending away from the front column, a sliding and locking sleeve being mounted on said rear column to cooperate with the corresponding open bore formed in the caliper, characterized in that said sleeve is equipped at its periphery with a radial projection made of a resilient material and extending from said periphery to cooperate with the central portion of the cylindrical part of said C-shaped bore in which said rear column is engaged, said radial projection being mounted compressed between said periphery and said part of the bore in order to take up the plays and the manufacturing tolerances and to prevent any parasitic pivoting of the caliper in said plane, as well as the noises due to the vibrations of the whole of the brake during its use.

A particular embodiment of the invention will now be described by way of non-limiting example, with reference to the accompanying drawings in which:

FIG. 1 is an end view of a disc brake made according to the invention, one half being illustrated in cross section.

FIG. 2 is a view from above of the disc brake of FIG. 1, certains parts being illustrated in section.

FIG. 3 is a view in section, on the line 3—3 of FIG. 2, of the sleeve equipping the brake of FIG. 2, illustrated in the position which it occupies after mounting on the brake.

FIG. 4 is an end view of a disc brake according to the invention showing the assembly phases of the brake, and FIG. 5 is a view from above, in section, of the brake illustrated in FIG. 4, showing the assembly phases of the brake.

The disc brake illustrated in FIGS. 1 to 5 comprises a support member 10 adapted to be associated with a fixed portion of the vehicle (not illustrated) and consisting, in the illustrated embodiment, of a plate disposed in the vicinity of a disc 12 adapted to be associated in rotation with a wheel of the vehicle (not illustrated). The fixed support 10 receives, for sliding, by means of two circumferentially spaced axial columns 16 and 18, a movable caliper 14 straddling the disc. The axes of the columns 16 and 18 are substantially parallel to the axis of rotation of the disc 12 and the columns 16 and 18 are disposed between the fixed support 10 and arms 20 and 22 formed in the caliper 14. The caliper 14 comprises actuating means 24 consisting of a hydraulic brake motor (see FIG. 5) comprising a piston 26 mounted for sliding in a bore 28 defined in the caliper 14 and sensitive to the pressure prevailing in a control chamber 30 adapted to be connected to a source of pressure such as the master cylinder of the vehicle, for example. The piston 26 is disposed in such a manner as to urge directly a first friction element 32 against a first face of the disc 12 when the fluid under pressure is admitted in the chamber 30. The caliper 14 is adapted to be displaced by reaction, leading to the sliding of the latter on the columns 16 and 18 so as to urge a second friction element 34 against the other face of the disc 12. As FIG. 1 shows, in particular, the friction element 34 is supported for sliding an anchoring by circumferentially spaced edges 40 of an aperture formed in the fixed support 10. The friction element 32 is likewise received anchored and for sliding on the fixed support 10 in an identical manner.

In the illustrated embodiment, and as FIG. 2 shows more particularly, the two columns 16 and 18 are associated with the fixed support 10 by a threaded connection. More precisely, the columns 16 and 18 which permit the sliding movement of the caliper 14 are mounted screwed to said fixed support. In the illustrated example, each of the columns is provided with a head in which is formed a hollow hexagonal screw head 36 enabling the columns to be screwed by means of a corresponding spanner (not illustrated).

When the disc 12 rotates in the direction corresponding to the forward travel of the vehicle designated by an arrow A in FIG. 1, it enables the columns 18 to be defined as a front column of the brake and the column 16 as a rear column of the brake. The arms 20 and 22 of the caliper 14 are provided with bores, or openings 38 and 40 in which the columns 16 and 18 are respectively threaded. The bores 38 and 40 are each provided with a notch, 42 and 44 respectively, in such a manner that the two bores 38 and 40 have the form of a C in cross section. Considering FIG. 4, the notch 42 is directed substantially parallel to the plane passing through the axes of the columns 16 and 18 and opens towards the outside of the brake. The notch 44 is directed substantially perpendicular to the plane defined above and opens vertically downwards.

Referring to FIGS. 2 and 5, it will be seen that the columns 16 and 18 are each provided with a cylindrical sleeve, 46 and 48 respectively, closed at one end and threaded over the corresponding column. The sleeve 48 cooperates with the column 18 and is rigidly connected to the arm 22 of the caliper 14 by means of a spring 50 housed in corresponding grooves formed in the arm 22 and in the sleeve 48. The caliper 14 slides by means of the sleeves 46 and 48 on the columns 16 and 18 fixed to the fixed support 10.

According to the invention, the sleeve 46, mounted on the rear column 16, is provided, at its periphery, with a radial projection 52 made of a resilient material and extending axially along an external generatrix of the sleeve 46. The external edge 54 of the projection 52 cooperates with the cylindrical portion of the bore 38 situated facing it. In the illustrated embodiment the projection 52 is an integral part of an anti-noise sleeve 51, made of resilient material and threaded over the sleeve 46. In order to take up the plays, and to ensure its anti-noise spring and recentring of the brake functions, the projection 52 is mounted slightly compressed between the sleeve 46 and the bore 38. Any pivoting of the caliper in the plane passing through the axes of the columns is thus rendered impossible or is immediately cancelled under the effect of the resilient reaction caused by an additional compression of the resilient projection 52.

It will be understood that in order to ensure the satisfactory operation of the projection, the latter must extend, towards the cylindrical portion of the bore 38, substantially in the plane passing through the axes of the columns 16 and 18, mentioned above.

In order to maintain the projection 52 in this plane, the resilient sleeve 51 is provided with two peripheral beads 56 and 58, which extend axially and cooperate with flats 60 and 62 formed in the bore 38. It will be understood that any rotation of the anti-noise sleeve 51 in relation to the bore 38 is thus prevented.

The operation of mounting the caliper 14 on the fixed support 10 is effected in the following manner:

The two columns 16 and 18 being already screwed onto the fixed support 10, the sleeve 46, previously provided with its anti-noise sleeve 51, is threaded over the column 16. The caliper 14 is then presented so as to engage the notch 42 on the sleeves 46 and 51 taking care to effect a correct positioning of the sleeve 51 and of its projection 52 in the open bore 38. The caliper 14 is rocked, in accordance with the arrow B, on the support 10 by causing it to pivot about the column 16, which has the effect of engaging the latter in the vertical notch 44. A force is then applied to the caliper 14 in accordance with the arrow C (contained in the plane passing through the axes of the two columns) so as to compress the projection 52 slightly between the sleeve 46 and the bore 38. This slight compression permitting the column 18 and the bore 40 to be positioned substantially coaxially, this position being maintained, the sliding and locking sleeve 48 is threaded on axially (in accordance with the arrow D of FIG. 5). When the force applied to the yoke 14 in accordance with the arrow C is relaxed, the resilient projection 52, previously compressed, expands slightly so as to take up the functional plays. All that remains is to introduce the locking spring 50 of the sleeve 48 in accordance with the arrow E. It should be noted that the use of a locking element for the sleeve 46 is rendered useless because of the frictional cooperation existing between the projection 52 and the bore 38 which opposes any axial displacement of the sleeve 46 in relation to the caliper 14.

The dismounting of the brake is effected in the reverse order of the operations which have just been described.

It is therefore clear, from reading the above, that the projection 52 acts as an element absorbing the vibrations which may exist between the yoke and the fixed support while ensuring a function of taking up the plays and the manufacturing tolerances and of recentring the caliper.

We claim:

1. A disc brake with a caliper, means including a pair of axial columns for mounting said caliper on a fixed support in which two friction elements are anchored, said friction elements being capable of coming into frictional engagement with the opposite faces of a rotating disc on operation of actuating means consisting of a brake motor acting directly on one of the friction elements and acting on the other friction element by reaction through the sliding caliper, said columns passing through bores provided in the fixed support and through openings in the caliper, said openings provided in the caliper being provided with notches and the walls of said caliper openings having substantially the form of a C in cross section in such a manner that said columns can be introduced into the openings by being presented transversely in relation to their longitudinal axes, said pair of columns defining a front column and a rear column, the notch in the opening in which the rear column is engaged being directed in the direction of the plane containing the longitudinal axes of the two columns and extending away from the front column, a sleeve assembly being mounted relative to said rear column to cooperate with the corresponding opening formed in the caliper, characterized in that said sleeve assembly is provided at its periphery with a radial projection made of a resilient material and extending radially outwardly from said periphery to cooperate with a central portion of the wall formed by the caliper opening which receives said rear column, said radial projection being compressed between said periphery and said caliper opening wall in a predetermined position in order to take up the play and the manufacturing tolerances and to avoid pivoting of the caliper relative to said pair of columns as well as the noises due to the vibrations of the whole of the brake during its use, said sleeve assembly being provided with at least one bead spaced circumferentially from said projection, said projection and said bead being integral with the sleeve assembly and extending axially of the peripheral of the sleeve assembly, said bead enabling any relative rotation of said sleeve assembly in relation to said bore to be avoided so as to maintain said projection in the predetermined position in relation to said caliper opening.

* * * * *